United States Patent Office 3,178,771
Patented Apr. 20, 1965

3,178,771
APPARATUS FOR THE PRODUCTION OF THIN-WALLED CONTAINERS OR RECEPTACLES FROM A THERMOPLASTIC FILM OR SHEET
Reiner Fischer, Cologne, Germany, assignor to Foster Grant Company, Inc., Leominster, Mass., a corporation of Delaware
Filed Mar. 10, 1961, Ser. No. 94,932
Claims priority, application Germany, Mar. 12, 1960, F 30,744, F 30,745
3 Claims. (Cl. 18—19)

This invention relates to an apparatus for the production of thin-walled containers open at one end, as for example cups, from heat-deformable or thermoplastic material.

The molding of heat-deformable, so-called thermoplastic, plastic material is achieved by casting or pouring, injection molding, or extrusion pressing. Only the latter two, viz. injection molding and extrusion pressing, are suitable for producing thin-walled containers or receptacles from thermoplastic plastic materials.

Since, however, in thin-walled containers the thickness of the container or receptacle walls is very slight in comparison with the surface expanse of the container, the force on the pressing piston or plunger in injection molding, or the force on the endless screw in extrusion pressing, must be very high in order to guarantee complete filling of the mold. Thus, the stresses and wear and tear on the press' piston or plunger and cylinder, or respectively, on the endless screw, are very high. Moreover, these devices require a mold with a core.

Devices are already known for the production of open-ended containers from thermoplastic plastic material, in which a heated plastic sheet is brought in front of the opening of a mold corresponding to the exterior shape of the container and is pressed by the edge of said mold opening against the surface of a bearing table. In so doing, the portion of said sheet positioned within the confines of said mold opening edge is stretched into the mold by means of the introduction of compressed air into a discharge tube in the region of the mold opening in the said upper surface of the bearing table. However, known devices or apparatus of this type still possessed various disadvantages. In one such device or apparatus, for example, the plastic sheet rested or lay only loosely on the edges or rim of the mold opening and must be able to lie at one time on the heated hot plate and at another time on the cold mold. Thus it is necessary to have an intermediate space to make it possible for the plastic sheet to be pressed against the bearing table by the mold opening edge. Nevertheless, this is of the utmost importance, since by this process clean or neat edges and rims are not obtained on the products, which is absolutely necessary for subsequent pressing. Also in this known device or apparatus there is also the disadvantage that, because of the previously mentioned intermediate space, very large quantities of compressed air are required. Finally, in comparison to the diameters only a slight depth of depression is possible, since the bottom of the depressed object is overstretched and the walls are not sufficiently stretched.

According to another similar device or apparatus known the thermoplastic material is not employed as a sheet, but is first injected in a crude state and is completed or injected or formed by distension. To accomplish this a core is necessary.

A device or apparatus has also been known in which the thin-walled containers were produced by a deep drawing of the plastic sheet into a ribbon shape. In this case a mandrel and matrix mold are necessary.

The known devices or apparatus have the inherent disadvantages that irregular wall thicknesses are present in the finished container because of the even admittance and working out of the plastic sheet by the introduced compressed air, which appears to be especially disagreeable when the container product should be very thin-walled. Moreover, it happens that, during inflation or formation, the sheet can be irregularly warped, or respectively, arched out, which is particularly influential on the final shaping.

This invention deals with the problem of accomplishing a rapid, regular forming of a pre-heated sheet into an open end thin-walled container or receptacle having a desired uniform wall thickness. This is attained here in accordance with this invention by carrying out the process here in which the sheet is mechanically pre-stretched and brought into final shape by compressed air.

An especially advantageous development exists in that the mechanical pre-stretching of the sheet and the final shaping by compressed air are controlled in periodic succession.

A very suitable device or apparatus for implementing the process includes one or more molds each removably arranged in position in the apparatus, so that the sheet can be firmly squeezed onto the bearing table with the mold edge, a piston placed in the bearing table, said piston being capable of being inserted up into the mold interior for the purpose of mechanically pre-shaping the sheet, an additional piston removably held on the other side of the sheet in the middle portion of the mold so that the sheet is pressed into the middle between the two pistons, and one or a plurality of compressed air ducts provided in the bearing table in the region of the sheet to be shaped.

The following detailed description is an example and is illustrative of the perferred embodiment of this invention.

Figure 1:
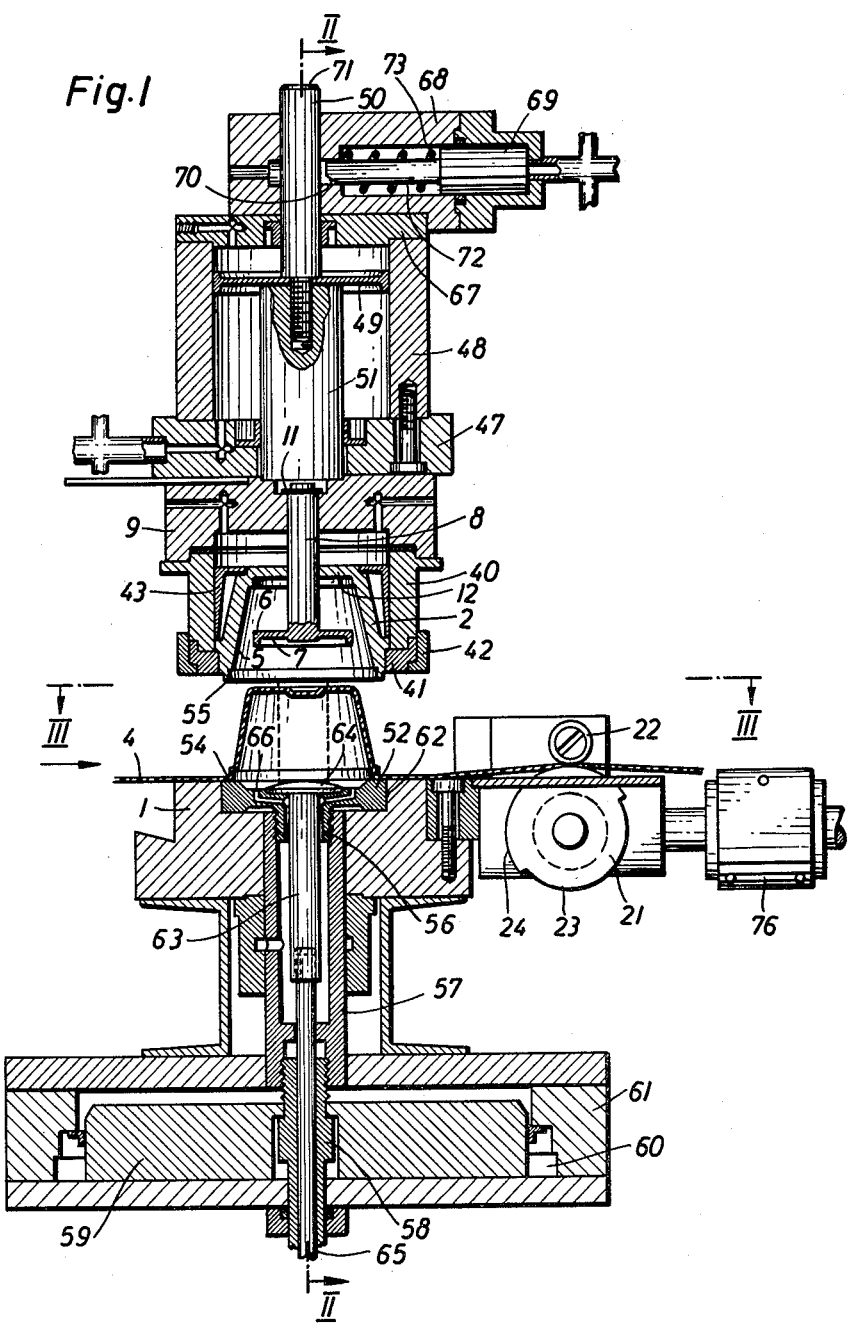
FIGURE 1 is a lengthwise section through the apparatus or device.
Figure 2:
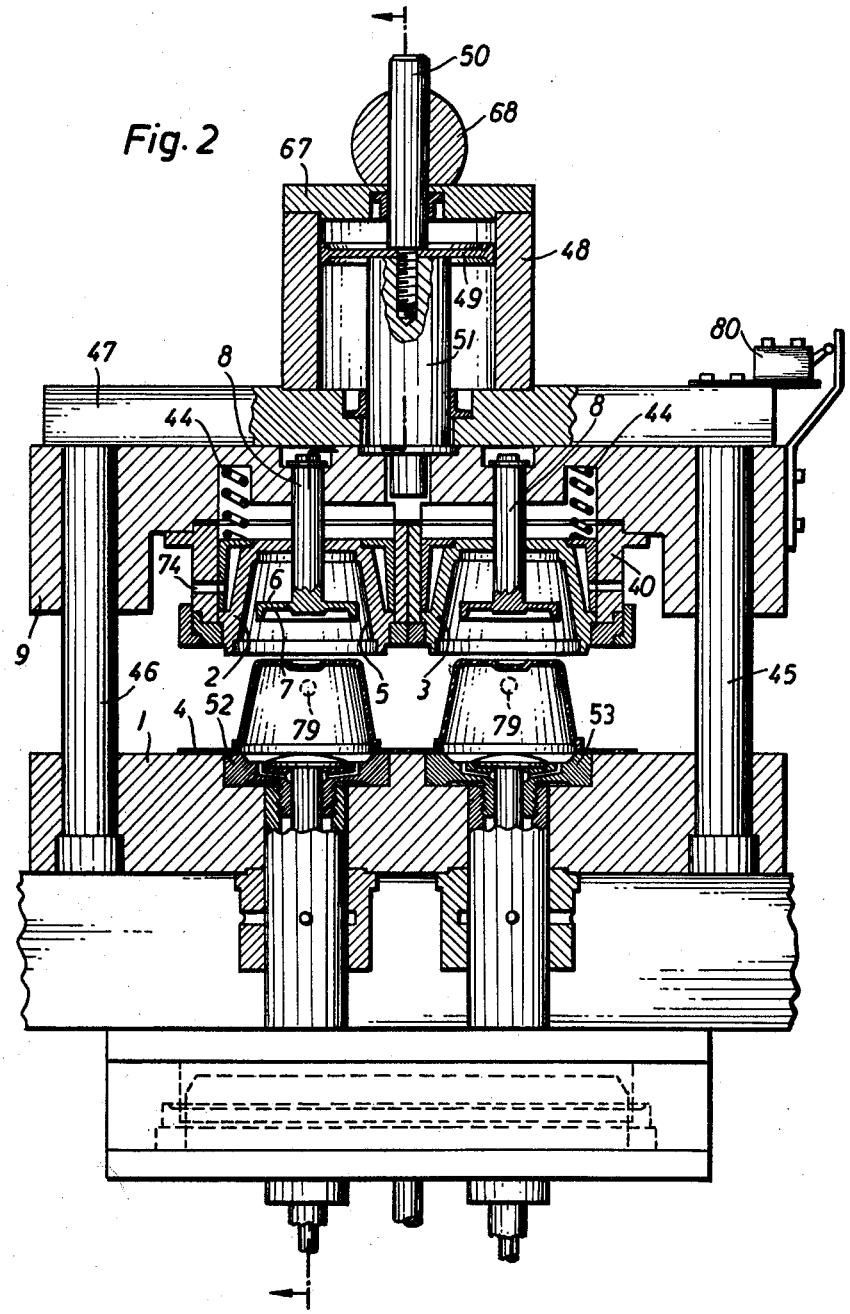
FIGURE 2 is a cross-section through the device or apparatus of FIGURE 1 and shows two molds adjacent to each other arranged transversely to the sheet's direction of advance.

The device or apparatus conforming to FIGURES 1 and 2 consists of a fixed bearing table 1 and two vertically displaceable molds 2 and 3, here shown to be similarly shaped, which are arranged next to one another transversely to the direction of movement of the plastic sheet to be molded or shaped or worked. The inner surface 5 of the mold is the same shape as the container to be produced. The mold holds a piston 6 whose side or surface 7 turned toward sheet 4 corresponds to the exterior or outer configuration or shape of the container bottom to be formed. The piston 6 and/or the molds 2, 3 are provided with passage openings, not illustrated, particularly in the region of the base of the mold, in order that the air contained in the mold can escape through them during the working of the sheet further described below. The piston 6 is fastened onto a rod 8 which is guided in a base part 9 carrying the molds. The pistons may be urged downwardly under the action of an unillustrated leaf spring which has as flat a curve as possible. In general, nevertheless, the weight of the piston, including the rod 8, suffices to produce a sure downward pressure on the piston surface 7. Downward movement of piston 6 is limited by stop 11, as clearly shown in FIGURE 1. The path of motion of the piston 6 into the mold is counter to the effect of its weight, or respectively the un-illustrated spring, up to the base 12 of the mold serving as a stop or an abutment.

The molds 2 and 3 are enclosed by a jacket 40 which is bolted onto the base part 9. On the lower end of the jacket a cutting ring 41 is found, whose inner edge serves as a cutting edge for the cutting out of the container from the sheet to be described later. The cutting ring is held from the outside by a fastener ring 42. Between the jacket 40 and the mold 2, or respectively 3, in question, a cylindrical or container bushing 43 is found which is mounted together with the molds, 2, 3, so as to be movable for a short distance inside of the jacket. During the cutting process the mold with the bushing is moved upward, and indeed against the force of the springs 44, which insure that these parts are returned again into their original position after the cutting, namely, into the position which is shown in the drawing.

As FIGURES 1 and 2 show, the container construction for the molds, or respectively, for the cutting ring, is designed so that not only the cutting ring, but also the molds, can be exchanged for new ones with little manipulation.

The entire container construction for the molds just now described is fastened on the base part 9 in accordance with FIGURES 1 and 2. The base part 9, for its part, is movably held on the fixed pistons 45 and 46. The pistons 45 and 46 are fastened on their lower ends into the bearing table 1 and carry on their upper ends a cross head 47. On cross head 47 a cylinder 48 is erected in which is found piston 49, which is combined with rod 50 on its upper side and with pressure piston 51 on its under side. The pressure piston 51, for its part, is combined with the base part 9 (so as to close the mold) so that with a downward movement of the piston 49, the base part 9 and molds 2 and 3 are also moved downwardly by it at the same time. Control of piston 49 inside cylinder 48 takes place by a pneumatic method demonstrated to be effective. This is also of value for the upward movement of piston 49 after the actual production process for the container.

Corresponding to the number of the molds, inserts 52 and 53 are provided in bearing table 1 over whose upper edge 54 the corresponding edge 55 is capable of being put, and thereby firmly squeeze the sheet to be formed. Inserts 52 and 53 are displaceably held in the bearing table 1. For this purpose each insert has on its underpart a ring-shaped continuation 56, on which a tube 57 is connected or fitted which for its part is attached on an intermediate part 58 with a piston 59. The piston can be moved up and down in the space 60 of a pneumatic pressure device 61. The upper edge of the exterior cylindrical jacket 62 serves as a cutting edge in combination with the cutting ring 41.

Inside of the inserts 52 and 53, or respectively, tube 57, a piston 63 is provided which has a beveled mushroom-like head 64 on its upper part. On piston 63, and indeed in the direction of the axis of symmetry, shaft 65 is connected downward, which for its part can be controlled and moved in an axial direction by an unillustrated pneumatic pressure arrangement. The piston with the mushroom-shaped head serves for the mechanical pre-stretching of the sheet to be worked. For this purpose the pneumatic movement apparatus (which has a cylinder and a movable piston within it arranged in a suitably known manner) is shaped so that the piston permits executing mechanical pre-stretching of the sheet, for example, of from 50% to perhaps 95% of the final shaping of the container. For this the piston is controlled so that it presses the middle part of the sheet to be worked against the inner surface 7 of piston 6 and, during the shaping, moves correspondingly toward piston 6.

Inserts 52 and 53 display one or more passage openings 66 which are fitted over the corresponding bore holes and ducts to a compressed air source and provide for conduction of compressed air. Several such passage openings are provided with the particular or special advantage for the piston 63, or respectively, head 64, so that uniform exhaust of the compressed air results. The means of combining the passage openings with the compressed air source are constructed from the common basic parts such as connecting pipes, bored holes, etc., so that a specific representation of these means is omitted in the drawings.

On the upper part of cylinder 48 a cover 67 is provided which carries a locking device near the supply opening for the air for the control of piston 49. This locking device consists of a cylindrical housing 68 through which rod 50 leads back through and in which is placed a bolt or pin 69 transversely to the direction of motion of the rod. The front part of the bolt has a slight rounding 70, in order that the bolt may slide with certainty over the rear surface 71 of rod 50. The lower edge of the front bolt portion 72 has a flat shape. Movement of the bolt results from air pressure, while the piston is moved back again from its locked position to its rest position with the help of its pressure spring 73.

As it is more precisely hereinafter described, during the cutting process the spar or pin bolt serves to prevent a raising of the molds with trimming of edges of the containers. While for cutting a pressure of perhaps eight to ten atmospheres is required, an air pressure of about two atmospheres is needed for the molding or shaping itself.

A special connecting passage 74 may be provided with particular advantage leading to the intermediary space between molds 2, 3, and bushing 43, by means of which an agent for the correct regulation of the temperature of the mold can be practically introduced.

Figure 3:
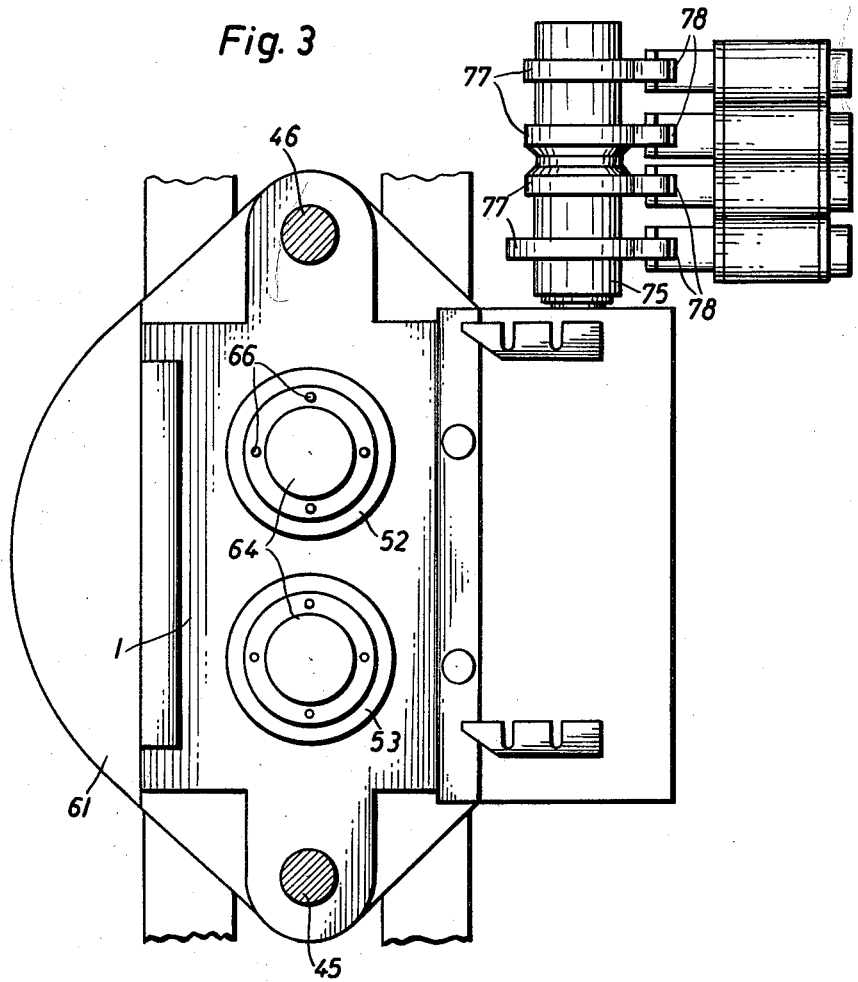
FIGURE 3 is a cross-sectional view taken along line III—III of FIGURE 1.

Control of the above described device is fully automatic, and is so with the help of a camshaft 75 which is shown in FIGURE 3. The camshaft is connected mechanically with driving motor 76 in such a way that the individual pneumatic control processes, or respectively, impulses of compressed air in relationship to the drive, are depended upon the forward movement of the sheet. Moreover, the camshaft 75 is so shaped that the individual occurrences of movement follow after one another in the correct series. The individual cams 77 of the camshaft control the movement of the cam-pushrods 78 which for their part open or close valves for the supply of compressed air into the individual operating cylinders. As an advantage reduction valves which can be adjusted to a certain desired pressure are provided in the individual compressed air ducts which can be placed under pressure in this manner. For the sake of clarity the reduction valves as well as the individual ducts connecting the pressure producing apparatus to the pneumatic cylinders have not been included in the drawing.

Two pairs of rollers 21 and 22, vertically over one another, are provided for transport of plastic sheet 4. The lower roller is driven. It exhibits on a part 23 of its circumference a smaller radius than on the remaining circumference 24. In this manner it happens that the further transport of the sheet occurs only during the time in which part 24 of roller 22 lies against and squeezes the plastic sheet, while the sheet is released at the part 23 of the circumference and remains at rest because of this. The conveyor adjustment is so connected with the camshaft that the complete work process on the heated sheet occurs during the passing of the circumference-part 23 on roller 22.

The manner of operation of the device described above follows:

The previously heated plastic sheet 4 moves through the device as long as the circumference-part 24 of roller 21 is against roller 22. In this situation the molds 2, 3, or respectively inserts 52, 53, are found in the position shown in the drawing. Roller 22 is moved with constant rotational speed. As soon as it is opposite the diminished circumference-part 23 of roller 21, the sheet 4 remains at rest. In this period the base part 9 and with it the two molds 2 and 3 move downward by means of the pressure piston 51, and the sheet 4 is firmly squeezed between surfaces 54 and 55. Thereby piston 6 is put against the sheet likewise as a result of its own weight, and to be sure, against the corresponding inserts 52, 53. In this position, i.e. in the middle of the firmly clamped sheet, a cooling and a strengthening occurs in this way, which has the result that the base of the container ready to be shaped has a greater thickness and a corresponding strength compared to the wall parts.

In this situation the control cylinder for piston 63 receives, through the effect of the camshaft, which additionally revolves with a constant rotational speed, a pressure impulse, so that the mushroom-like head 64 of the piston rises during a simultaneous lifting of piston 6, and in this way carries out a mechanical pre-shaping of the sheet. As soon as the desired amount of this mechanical pre-shaping is reached, the supply for the compressed air is opened by means of the controlling of a further cam of the camshaft, so that the compressed air is delivered through openings 66 and the sheet is pressed into the final shape, whereby the air between the outer surface of the sheet and the inner upper surface 5 of the mold escapes out through holes (not illustrated) in the mold, or respectively, in piston 6. As soon as the sheet lies against the outer wall of the mold, it cools it in such a way that it is strengthened immediately.

Now the cutting process takes place, which occurs by piston 59 being pneumatically pressed up so that inserts 52 and 53 are likewise moved upward and, as described above, the molds 2 and 3 are slid back from them against the spring force of springs 44. Before the piston is pneumatically moved, regulating of rod 50 occurs by means of the above explained regulating device. For this purpose the bolt 69 is shoved pneumatically in front of the rear surface of rod 50.

With the closing or meshing of the above described cutting edges, the rim of the finally shaped container is cut. Now the inserts can again be retracted pneumatically and the base part 9 along with the molds is brought back up into the rest position, after bolt 69 is released by pneumatic pressure and is led back again into rest position by the described spring 73.

The finished containers are thrust out of the molds under the weight of piston 6 during the upward motion. Since the containers exhibit a small weight as a result of their proportionately slight wall thickness, they can be blown away with the aid of a horizontally or laterally arranged blowtube 79 into a bin. During this blowing away of the finished container, the sheet 4 is moved further for a corresponding interval, so that the process just now described can be repeated. An electrical-mechanical switch 80 can be provided (FIGURE 2) for starting and stopping the device.

The process described above shows, as already hereinabove indicated, the essential advantage that very good uniformity and material distribution of the sheet on the container walls is attained by the mechanical pre-stretching or pre-shaping of the sheet. Thereby a large finishing or working velocity is realized and the amounts of compressed air necessary are considerably reduced, which then appears very favorably, especially if a large number of devices or individual molds are connected to the same compressed air supply.

Also, the device or apparatus according to the invention, hereinbefore described in detail, has various considerable advantages in its entirety. First of all, the containers can be produced in a single work process, proceeding from the preheated sheet to the completed container in a simple and inexpensive manner. Although the wall thickness of the container can be produced to an arbitrary thinness and uniformity, the base of the container is always formed in a reinforced shape with correspondingly greater strength. This formation is obtained quite automatically, without requiring a special forming expenditure for this.

In contrast to the devices known up until now, a special core is not needed for formation of the container. The mold itself can be produced from a material of proportionately little value, since a sliding motion of the material on the upper surface does not occur, for all practical purposes, and thus only a very slight wear and tear occurs on the mold. Moreover, because of the shape according to the invention, a very simple changing of the molds is made possible. A further advantage is given by the interchangeability of the molds, that is, containers can be produced in extremely different molds without the device as such being remodeled or altered. Thus containers can be produced with a circular shape, as illustrated, or also with oval, triangular, or rectangular bases. Moreover, it is possible to provide in the base or, in a given case, also in the walls of the container, externally or internally projecting transverse ribs. In the design of the shape desired for the container, one is thus in no way subjected to restrictions. The exterior mold shape is only selected for the purpose that a simple slipping-out of the molded container from the molds 2, 3 is possible. Moreover, the device according to the invention is very sturdy and reliable as to operation, owing to the very simply constructed design.

The force with which the plastic film must be pressed against the mold is significantly less than the force of the pressing piston or screw for injection or extrusion molding devices. The pressure force of the mold must merely suffice to prevent slipping into the mold of the parts of the plastic sheet lying beyond the mold during introduction of compressed air and in order to guarantee at least an approximately airtight closing toward the outside of the space filled with the blast of compressed air.

A further advantage of the device according to the invention is to be seen in the fact that an ejector for pressing the completed container out of the mold is superfluous, since this expulsion is automatically undertaken by a spring-loaded or weight-loaded piston according to the invention as soon as the mold is removed from the bearing table.

In the above description and in the embodiment of the invention shown in the drawings, two molds are arranged next to each other transversely to the direction of transportation of the sheet. Instead of this, however, the device according to the invention can also be furnished with a single mold or with more than two such molds situated alongside one another. It was further described about the performance sample that control of individual operations resulted pneumatically with the aid of a camshaft. Instead of the operating parts being pneumatically connected, mechanically acting means can also be provided for individual courses of motion, such as reciprocating drivers, eccentric drivers, and the like. In conclusion, many differently constructed modifications of the device are possible without abandoning the basic ideas of the invention. The mechanical pre-shaping or pre-stretching of the sheet and the pneumatic final shaping a short time after one another have been suitably demonstrated as accomplishable by means of corresponding regulation of the control adjustment. Under certain circumstances it can also be advantageous, however, to perform the mechanical shaping or stretching along with the assistance of the compressed air at the same time.

I claim:

1. Apparatus for the production of thin-walled containers from thermoplastic heat-formable material, said apparatus comprising:
    a bearing table;
    at least one insert being mounted in said bearing table and being vertically movable with respect thereto;
    said insert having an annular portion being substantially horizontal and extending around the periphery of said insert;
    said annular portion terminating in a vertical side portion of said insert;
    a first vertically displaceable shaping piston extending through the center of said insert;

said first piston being adapted to move vertically with respect to said insert;

at least one opening extending through the top of said insert and providing a passageway for the admission of compressed air therethrough;

a mold cavity located vertically above and in alignment with said insert;

said mold cavity being mounted in a vertically movable mold support for vertical movement therewith;

said mold cavity being further slidably mounted in said mold support for vertical movement relative thereto;

said mold cavity being normally biased into a lower position with respect to said mold support;

a cutting ring extending around the circumference of the mold cavity and being mounted on the bottom of said mold support;

said cutting ring having an opening substantially conforming to, but being slightly larger than the configuration of the vertical side portion of the insert;

a second vertically displaceable shaping piston positioned in said mold cavity for movement with respect thereto and being coaxially aligned with said first piston;

means for moving said mold cavity, and said second piston downwardly into engagement with a sheet to be formed whereby said sheet is firmly clamped between said mold cavity and said horizontal portion of said insert;

said second piston being yieldably biased into engagement with the top of said sheet to be formed;

means for moving said first piston upwardly to move a portion of said sheet upwardly against the action of said second piston to mechanically pre-stretch said sheet and partially preform said container;

said opening providing for the admission of compressed air into the partially preformed container to expand same completely against the sides of the mold cavity;

means for moving said insert and said mold cavity upwardly with respect to said mold cavity support and said cutting ring whereby the formed container is sheared from said sheet; and means for moving said mold, said mold support, and said cutting ring upwardly with respect to said mold insert so as to allow the formed container to be ejected from the mold table.

2. Apparatus for the production of thin-walled containers from thermoplastic heat-formable material, said apparatus comprising:

a bearing table;

at least one insert being mounted in said bearing table and being vertically movable with respect thereto;

said insert having an annular portion being substantially horizontal and extending around the periphery of said insert;

said annular portion terminating in a vertical side portion of said insert;

a first vertically displaceable shaping piston extending through the center of said insert;

said first piston being adapted to move vertically with respect to said insert;

at least one opening extending through the top of said insert and providing a passageway for the admission of compressed air therethrough;

a mold cavity located vertically above and in alignment with said insert;

said mold cavity being mounted in a vertically movable mold support for vertical movement therewith;

said mold cavity being further slidably mounted in said mold support for vertical movement relative thereto;

said mold cavity being normally biased into a lower position with respect to said mold support;

a cutting ring extending around the circumference of the mold cavity and being mounted on the bottom of said mold support;

said cutting ring having an opening substantially conforming to, but being slightly larger than the configuration of the vertical side portion of the insert;

a second vertically displaceable shaping piston positioned in said mold cavity for movement with respect thereto and being coaxially aligned with said first piston;

means for moving said mold cavity, and said second piston downwardly into engagement with a sheet to be formed whereby said sheet is firmly clamped between said mold cavity and said horizontal portion of said insert;

means for moving said first piston upwardly to move a portion of said sheet upwardly against the action of said second piston to mechanically pre-stretch said sheet and partially preform said container;

said opening providing for the admission of compressed air into the partially preformed container to expand same completely against the sides of the mold cavity;

means for moving said insert and said mold cavity upwardly with respect to said mold cavity support and said cutting ring whereby the formed container is sheared from said sheet; and means for moving said mold, said mold support, and said cutting ring upwardly with respect to said mold insert so as to allow the formed container to be ejected from the mold table.

3. Apparatus for the production of thin-walled containers from thermoplastic heat-formable material, said apparatus comprising:

a bearing table;

at least one insert being mounted in said bearing table and being vertically movable with respect thereto;

said insert having an annular portion being substantially horizontal and extending around the periphery of said insert;

said annular portion terminating in a vertical side portion of said insert;

a first vertically displaceable shaping piston extending through the center of said insert;

said first piston being adapted to move vertically with respect to said insert;

at least one opening extending through the top of said insert and providing a passageway for the admission of compressed air therethrough;

a mold cavity located vertically above and in alignment with said insert;

said mold cavity being mounted in a vertically movable mold support for vertical movement therewith;

said mold cavity being further slidably mounted in said mold support for vertical movement relative thereto;

said mold cavity being normally biased into a lower position with respect to said mold support;

a cutting ring extending around the circumference of the mold cavity and being mounted on the bottom of said mold support;

said cutting ring having an opening substantially conforming to, but being slightly larger than the configuration of the vertical side portion of the insert;

a second vertically displaceable shaping piston positioned in said mold cavity for movement with respect thereto and being coaxially aligned with said first piston;

means for moving said mold cavity, and said second piston downwardly into engagement with a sheet to be formed whereby said sheet is firmly clamped between said mold cavity and said horizontal portion of said insert;

means for moving said first piston upwardly to move a portion of said sheet upwardly against the action of said second piston to mechanically pre-stretch said sheet and partially preform said container;

said opening providing for the admission of compressed air into the partially preformed container to expand same completely against the sides of the mold cavity; and means for moving said insert and said mold cavity upwardly with respect to said mold cavity support and said cutting ring whereby the formed container is sheared from said sheet.

References Cited by the Examiner

UNITED STATES PATENTS

| | | | |
|---|---|---|---|
| 871,966 | 11/07 | Stewart | 18—56 |
| 1,482,707 | 2/24 | Skinner | 18—56 |
| 1,793,089 | 2/31 | Heyes | 18—19 |
| 1,879,555 | 9/32 | Simmons | 18—19 |
| 2,295,066 | 9/42 | Weikert | 18—56 |
| 2,510,214 | 6/50 | Ekstedt et al. | 18—56 |
| 2,531,539 | 11/50 | Smith | 18—19 |
| 2,854,694 | 10/58 | Mumford | 18—19 |
| 2,910,728 | 11/59 | Rowe | 18—19 |
| 2,912,718 | 11/59 | Thiel | 18—19 |
| 2,962,758 | 12/60 | Politis | 18—19 |
| 2,973,558 | 3/61 | Stratton | 18—56 |
| 2,983,955 | 5/61 | Gajosik | 18—19 |

FOREIGN PATENTS

| | | |
|---|---|---|
| 209,544 | 7/57 | Australia. |
| 604,133 | 8/60 | Canada. |

WILLIAM J. STEPHENSON, *Primary Examiner.*

MICHAEL V. BRINDISI, *Examiner.*